(12) United States Patent
Crawford et al.

(10) Patent No.: US 8,498,853 B2
(45) Date of Patent: Jul. 30, 2013

(54) PETROPHYSICAL METHOD FOR PREDICTING PLASTIC MECHANICAL PROPERTIES IN ROCK FORMATIONS

(75) Inventors: Brian R. Crawford, Missouri City, TX (US); Maurice J. Gooch, Katy, TX (US); David W. Webb, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 593 days.

(21) Appl. No.: 12/772,682

(22) Filed: May 3, 2010

(65) Prior Publication Data

US 2011/0015907 A1     Jan. 20, 2011

Related U.S. Application Data

(60) Provisional application No. 61/226,999, filed on Jul. 20, 2009.

(51) Int. Cl.
*G06G 7/48*     (2006.01)

(52) U.S. Cl.
USPC .......................................................... 703/10

(58) Field of Classification Search
USPC .......................................................... 703/10
See application file for complete search history.

(56) References Cited

U.S. PATENT DOCUMENTS

| | | | |
|---|---|---|---|
| 4,445,032 A | 4/1984 | Halker et al. | |
| 5,398,215 A | 3/1995 | Sinha et al. | |
| 5,416,697 A | 5/1995 | Goodman | |
| 5,442,950 A | 8/1995 | Unalmiser et al. | |
| 5,475,650 A | 12/1995 | Sinha et al. | |
| 5,485,431 A | 1/1996 | Johnson et al. | |
| 5,521,882 A | 5/1996 | D'Angelo et al. | |
| 5,544,127 A | 8/1996 | Winkler | |
| 5,619,475 A | 4/1997 | Winkler | |
| 5,741,971 A | 4/1998 | Lacy | |
| 5,767,399 A | 6/1998 | Smith et al. | |
| 6,098,021 A | 8/2000 | Tang et al. | |
| 6,302,221 B1 | 10/2001 | Hamman et al. | |
| 6,386,297 B1 | 5/2002 | Cooley et al. | |
| 6,654,692 B1 | 11/2003 | Neff | |

(Continued)

FOREIGN PATENT DOCUMENTS

| | | |
|---|---|---|
| WO | WO 2008/028075 | 3/2008 |
| WO | WO 2008/131351 | 10/2008 |

OTHER PUBLICATIONS

Knackstedt et al. "Digital Core Laboratory: Properties of Reservoir Core Derived from 3D Images", SPE 87009 2004.*

(Continued)

*Primary Examiner* — Saif Alhija
(74) *Attorney, Agent, or Firm* — ExxonMobil Upstream Research Company Law Dept.

(57) ABSTRACT

Method for prediction of mechanical properties used in the description of large-strain plastic deformation for any subsurface rock strata of interest. The method is not specific to any geographic region, geological environment or subsurface depth interval, nor is it constrained to a specific lithology or plastic mechanical property. Predictive algorithms for triaxial compressive strength and rock compressibility are derived (23) from a mechanical properties database (21), and used to predict subsurface variation in mechanical properties such as rock strength or rock compressibility, with petrophysical properties generated from, for example, geophysical wireline logs as input to the algorithms (26).

13 Claims, 7 Drawing Sheets

U.S. PATENT DOCUMENTS

| | | | |
|---|---|---|---|
| 6,718,265 | B2 | 4/2004 | Herron et al. |
| 6,941,231 | B2 | 9/2005 | Zeroug et al. |
| 7,066,019 | B1 | 6/2006 | Papanastasiou |
| 7,181,380 | B2 | 2/2007 | Dusterhoft et al. |
| 7,357,196 | B2 | 4/2008 | Goldman et al. |
| 7,373,251 | B2 | 5/2008 | Hamman et al. |
| 7,404,456 | B2 | 7/2008 | Weaver et al. |
| 7,412,331 | B2 | 8/2008 | Calhoun et al. |
| 7,472,022 | B2 | 12/2008 | Birchwood |
| 7,526,385 | B2 | 4/2009 | Sayers |
| 7,539,625 | B2 | 5/2009 | Klumpen et al. |
| 7,546,884 | B2 | 6/2009 | Veeningen et al. |
| 7,548,873 | B2 | 6/2009 | Veeningen et al. |
| 7,555,414 | B2 | 6/2009 | Calhoun et al. |
| 7,649,804 | B2 | 1/2010 | Singha |
| 7,650,241 | B2 | 1/2010 | Jogi et al. |
| 2002/0112540 | A1 | 8/2002 | Zeroug et al. |
| 2004/0106699 | A1 | 6/2004 | Ishikawa et al. |
| 2004/0237640 | A1 | 12/2004 | Meister et al. |
| 2006/0041411 | A1 | 2/2006 | Yong et al. |
| 2006/0149478 | A1 | 7/2006 | Calhoun et al. |
| 2007/0294034 | A1 | 12/2007 | Bratton et al. |
| 2008/0028075 | A1 | 1/2008 | Dini et al. |
| 2008/0131351 | A1 | 6/2008 | Wang et al. |
| 2008/0249714 | A1 | 10/2008 | Calhoun et al. |
| 2008/0319726 | A1 | 12/2008 | Berge et al. |
| 2009/0006058 | A1 | 1/2009 | King |
| 2009/0132218 | A1 | 5/2009 | Ledgerwood, III |
| 2009/0187391 | A1 | 7/2009 | Wendt et al. |
| 2009/0260415 | A1 | 10/2009 | Suarez-Rivera et al. |
| 2009/0260883 | A1 | 10/2009 | Suarez-Rivera et al. |

OTHER PUBLICATIONS

Alberty, M. (1994), "The influence of the borehole environment upon compressional sonic logs," SPWLA 35$^{th}$ Annual Logging Symposium, Houston TX, Jun. 19-22, 1994, pp. 1-17.

Al-Qahtani, M. et al. (2001), "A Mathematical Algorithm for Modeling Geomechanical Rock Properties of the Khuff and Pre-Khuff Reservoirs in Ghawar Field," SPE 68194, 2001 SPE Middle East Oil Show, Bahrain, Mar. 17-20 2001, 8 pgs.

Bhuyan, K., et al. (1994), "Clay estimation from Gr and neutron-density porosity logs," SPWLA 35$^{th}$ Annual Logging Symposium, Houston TX, Jun. 19-22, 1994, pp. 1-15.

Carlson, M.R. (2003), "Practical Reservoir Simulation," PennWell, Tulsa OK, pp. 199-201.

Chang, C. et al. (2006), "Empirical relations between rock strength and physical properties in sedimentary rocks," J. Pet. Sci & Eng. 51, pp. 223-237.

Coates, G.R. et al. (198), "Mechanical properties program using borehole analysis and Mohr's circle," SPWLA 22$^{nd}$ Annual Logging Symposium, Mexico City, Jun. 19-22, 1981, pp. 1-17.

Cooper, G.A. et al. (2003), "Prediction of rock mechanical properties from wireline data and their use in drilling simulation," SPE 83509, presented at the SPE Western Regional/AAPG Pacific Section Joint Meeting, Long Beach CA, May 29-24, 2003, pp. 1-9.

Deere, D.U. et al. (1969), "Engineering classification and index properties for intact rock," Tech. Rep. AFWL-TR-65-116, pp. 148-161.

Edlmann, K. et al. (1998), "Predicting Rock Mechanical Properties from Wireline Porosities," SPE/ISRM 47344, SPE/ISRM Eurock '96, Trondheim, Norway, pp. 169-175.

Fjaer, E. et al. (1992), "Petroleum Related Rock Mechanics," Elsevier, Amsterdam, pp. 232-234.

Griffith, A.A. (1924), "Theory of rupture," Proc. 1$^{st}$ Int. Cong. Appl. Mech., Delft, pp. 53-63.

Guenther, K. et al., "South Diana, Gulf of Mexico, USA: A case study in reservoir management of a compacting gas reservoir," IPTC 10900, presented at the International Petroleum Technology Conference, Doha, Qatar, Nov. 21-23, 2005, 6 pgs.

Hall, H.N. (1953), "Compressibility of reservoir rocks," Trans. AIME 198, pp. 309-311.

Hill, R. (1952), "The elastic behavior of crystalline aggregate," Proc. Physical Soc. London, A65, pp. 349-354.

Hoek, E. et al. (1980), "Underground Excavations in Rock," Institution of Mining and Metallurgy, pp. 137-149.

Horsrud, P. (2001), "Estimating Mechanical Properties of Shale From Empirical Correlations," SPE 56017, Jun. 2001 SPE Drilling & Completion, pp. 68-73.

Jaeger, J.C. (1979), "Fundamentals of Rock Mechanics," 3rd Ed., Chapman & Hall, London, pp. 95-101.

Khaksar, A. et al. (2009), "Rock Strength from Core and Logs: Where We Stand and Ways to Go," SPE 121972, 2009 SPE Europe/Eage Annual Conf. & Exhibition, Amsterdam, The Netherlands, Jun. 8-11, 2009, pp. 1-16.

Khatchikian, A. (1995), "Deriving reservoir pore-vol. compressibility from well logs," SPE 26963, SPE Advanced Technology Series, v. 4, No. 1, pp. 14-20.

Kuster, G.T. (1974), "Velocity and attenuation of seismic waves in two-phase media: Part1. Theoretical formulations," Geophysics 39, pp. 587-606.

Lachance, D.P. (1983), "Comparison of uniaxial strain and hydrostatic stress pore-volume compressibilities in the Nugget sandstone," SPE 11971, presented at the 58$^{th}$ Annual Technical Conference and Exhibition, San Francisco CA, Oct. 5-8, 1983, 8 pgs.

Marion, D. et al. (1992), "Compressional velocity and porosity in sand-clay mixtures," *Geophysics* 57, pp. 554-563.

Mavko, G. et al. (1995), "Fluid substitution: estimating changes in VP without knowing VS," Geophysics 60, pp. 1750-1755.

Mavko, G. et al. (1998), "The Rock Physics Handbook—Tools for Seismic Analysis in Porous Media," Cambridge University Press, pp. 17-19, 110-112, 162-220.

McClintock, F.A. et al. (1962), "Friction on Griffith cracks under pressure," Proc. 4$^{th}$ US Nat. Cong. of Appl. Mech., pp. 1015-1021.

McLean, M.R. et al. (1990), "Wellbore stability analysis: a review of current methods of analysis and their field application," SPE 19941, presented at the SPE/IADC Drilling Conference, Houston TX, Feb. 27-Mar. 2, 1990, pp. 261-274.

McPhee, C.A. et al. (2004), "Sand Management Solutions for High-Rate Gas Wells, Sawan Field, Pakistan," SPE 86535, SPE Int'l. Symposium & Exh. On Formation Damage Control, Lafayette, LA, Feb. 18-20, pp. 1-11.

Murrell, S.A.F. (1963), "A criterion for brittle fracture of rocks and concrete under triaxial stress and the effect of pore pressure on the criterion," Proc. 5$^{th}$ Rock Mech. Symp., Pergamon Press, Oxford, pp. 563-577.

Newman, G.H. (1973), "Pore-volume compressibility of consolidated, friable and unconsolidated reservoir rocks under hydrostatic loading," JPT 25, pp. 129-134.

Nikravesh, M. (1998), "Neural Network Knowledge-Based Modeling of Rock Properties Based on Well Log Databases,", SPE 46206, 1998 SPE Western Regional Meeting, Bakersfield, CA, May 10-13, 1998, pp. 1-16.

Nouri, A. et al. (2006), "A comparison of two sanding criteria in physical and numerical modeling of sand production," J. Pet. Sci & Eng. 50, pp. 55-70.

Nur, A. et al. (1998), "Critical porosity: a key to relating physical properties to porosity in rocks," *The Leading Edge* 17, pp. 357-362.

O'Connell, R.J. et al. (1974), "Seismic velocities in dry and saturated cracked solids," J. Geophys. Res. 79, pp. 5412-5426.

Ong, S. et al. (2001), "Pressure-dependent pore vol. compressibility—a cost effective log-based approach," SPE 72116, presented at the SPE Asia Pacific Improved Oil Recovery Conference, Kuala Lumpur, Malaysia, Oct. 8-9, 2001, pp. 1-11.

Peska, P. et al. (1995), "Compressive and tensile failure of inclined wellbores and determination of in situ stress and rock strength," J. Geophys. Res. 100, pp. 12791-12811.

Raaen, A.M. et al. (1996), "Formel—a step forward in strength logging," SPE 36533, presented at the SPE Annual Technical Conference and Exhibition, Denver CO, Oct. 6-9, 1996, pp. 439-445.

Rhett, D.W. et al. (1992), "Stress path dependence of matrix permeability of North Sea sandstone reservoir rock," Proceedings of the 33rd US Symposium on Rock Mechanics, Santa Fe NM, Jun. 3-5, eds. Tillerson and Wawersik, Rotterdam: Balkema, pp. 345-353.

Sayers, C.M. et al. (2007), "Calibrating the Mechanical Properties and In-Situ Stresses Using Acoustic Radial Profiles," SPE 110089, 2007 SPE Annual Technical Conf. & Exh., Anaheim, CA, Nov. 11-14, 2007, pp. 1-8.

Simonson, E.R. et al. (1978), "Containment of massive hydraulic fractures," SPE Journal, pp. 27-32.

Steiger, R.P. et al. (1992), Quantitative Determination of the Mechanical Properties of Shales, SPE Drilling Engineering, pp. 181-185.

Teeuw, D. (1981), "Prediction of formation compaction from laboratory compressibility data," SPE Journal, pp. 263-268.

Tutmez, B. et al. (2007), "Spatial estimation of some mechanical properties of rocks by fuzzy modelling," Computers and Geotechnics, 34, pp. 10-18.

Vernik, L. et al. (1992), "Petrophysical classification of siliciclastics for lithology and porosity prediction from seismic velocities," AAPG 76, pp. 1295-1309.

Walls, J.D. et al. (2001), "The use of fluid substitution modeling for correction of mud filtrate invasion in sandstone reservoirs," 71st SEG, Ann. Inter. Mtg. and Expos., San Antonio, TX, Sep. 4-11, 2001, 3 pgs.

Wolfe, C. et al. (2005), "Log-based pore volume compressibility prediction—a deepwater GoM case study," SPE 95545, SPE Annual Technical Conference and Exhibition, Dallas TX, Oct. 9-12, 2005, pp. 1-10.

Yuan, S.C. et al. (2006), "A review of the state of the art in modeling progressive mechanical breakdown and associated fluid flow in intact heterogeneous materials," Int. J. Rock Mech. 43, pp. 1001-1022.

Zimmerman, R.W. (1991), "Compressibility of sandstones," Elsevier, Amsterdam, pp. 17-19, 110-139.

Alvarez, G.M., et al. (1999), "Fuzzy Model for the Prediction of Unconfined Compressive Strength Of Rock Samples", *Int. J. Rock Mech. Min. Sci.* 36(3), pp. 339-349.

Batzle, M., et al. (1992), "Seismic Properties of Pore Fluids", *Geophys* 50, pp. 2768-2774.

Crawford, B.R., et al. (2008), "Plastic Compaction and Anisotropic Permeability Development in Unconsolidated Sands With Implications for Horizontal Well Performance", *ARMA/CRMS Paper #08-160* Prepared for $42^{nd}$ US Rock Mechanics Symposium / $2^{nd}$ US-Canada Rock Mechanics Symposium, San Francisco, CA Jun. 29-Jul.

Fahy, M.P., et al. (1979), "Estimating Strength Of Sandstone Using Petrographic Thin-Section Data", *Bull Ass. Eng. Geol.* 16(4), pp. 67-485.

Khaksar, A., et al. (2006), "Rock Strength Determination Form Well Logs: A Review", Extended Abstract Presented at the AAPG International Conference & Exhibition, Perth Australia, Nov. 5-8.

Lee, Donald, et al. (1998) "Calibration of Wireline Mechanical Properties Using Whole Core Laboratory Results", *The Society of Core Analysts-9802*, 10 pages.

Merle, H.A., et al. (1976), "The Bachaquero Study—A Composite Analysis Of The Behavior Of A Compaction Drive/Solution Gas Drive Reservoir", *SPE JPT*, pp. 1107-1115.

Onyla, E.C. (1988), "Relationships Between Formation Strength, Drilling Strength, And Electric Log Properties", *SPE-18166*, 14 pages.

Reuss, A. (1929) "Estimation Of The Yield Surface Of Polycrystals Based On The Plastic Behavoir Of Single Crystals", *Zeit. Ang. Math. Mech.* 9, pp. 44-58.

Singh, V.K., et al. (2001), "Prediction Of Strength Properties Of Some Schistose Rocks From Petrographic Properties Using Artificial Neural Networks", *Int. J. Rock Mech. Min. Sci.* 38(2), pp. 269-284.

Voight, W. (1889), "On the Relationship Between the Two Elastic Constants of an Isotropic Body", *Weid. Ann.*, 38, pp. 573-587.

Yale, D.P., et al. (1993), "Application of Variable Formation Compressibility for Improved Rserovir Analysis", SPE 26647, $68^{th}$ SPE Annual Technical Conference and Exhibition, Houston, TX Oct. 3-6.

Zimmerman, R.W. (1986), "Compressibility of two-dimensional cavities of various shapes," *J. App. Mech.* 53, 500-504 (1986).

* cited by examiner

PETROPHYSICAL METHOD FOR PREDICTING PLASTIC MECHANICAL PROPERTIES IN ROCK FORMATIONS

CROSS-REFERENCE TO RELATED APPLICATION

This application claims the benefit of U.S. Provisional Patent Application 61/226,999, filed 20 Jul. 2009, the entirety of which is incorporated by reference herein.

FIELD OF THE INVENTION

The invention relates generally to the field of hydrocarbon production, and more particularly to the effect of oilfield operations on reservoir recovery and optimization. Specifically, the invention is a method for predicting large-scale plastic deformation of rock strata intersected by a well due to stress and strain changes caused by production activity.

BACKGROUND OF THE INVENTION

Reservoir pressure and temperature changes associated with oilfield operations can modify the in situ stress field, causing deformation (induced strains) within the stressed rock units. Such stress-strain response can dramatically impact petroleum engineering practices encompassing drilling, completing and stimulating wells to full-field reservoir recovery and optimization. To this end, the science of geomechanics seeks to understand and predict the impact of rock deformation (stress-strain behavior) in petroleum engineering applications, using numerical models of the subsurface.

All geomechanical models on the single-well to full-field scale, whether simple analytical calculations or complex fully-coupled finite-element simulations, require some knowledge of mechanical properties in order to describe the deformation behavior of the stressed rock units. However, mechanical properties can only be directly quantified from laboratory testing of recovered core from the lithologic units of interest. While much effort has been expended in designing sophisticated experimental techniques for measuring rock mechanical properties, subsurface model results will be severely limited if no core is available from the specific rock strata. Further, in many cases core measurements will be highly limited and thus discontinuous, biased towards mechanically stronger intervals due to core recovery issues and almost always absent from non-reservoir overburden and underburden lithologies.

Due to the impracticalities often associated with obtaining rock core for laboratory measurement of mechanical properties, the ability to predict such properties from other more easily measured or remotely-sensed material parameters has received widespread attention within the petroleum, civil and mining engineering, geophysical and structural geology communities over the last approximately fifty years.

Diverse analytical schemes exist that attempt to predict "elastic" mechanical properties (describing small-strain rock deformation behavior) through consideration of the influence of microstructure (grains, pores and cracks) on macroscopic constitutive behavior. For example, Mavko (1998), Zimmerman (1991) and Hill (1952) offer techniques for estimating the effective elastic (bulk and shear) moduli of a solid rock from knowledge of the volume fractions and moduli of the various mineral components. Numerous effective medium theories also exist that allow estimation of the effective elastic moduli of porous and cracked rocks (e.g. O'Connell and Budiansky, 1974, Kuster and Toksoz, 1974) including the impact of pore structure on elastic compressibility (Zimmerman, 1986) and elastic nonlinearity resulting from crack closure (Zimmerman, 1991). While estimation of elastic rock properties has practical geomechanical application in, for example, the modeling of hydraulic fracture containment (e.g. Simonson et al., 1978) knowledge of effective elastic moduli alone is insufficient to describe "plastic" (large-strain deformation) in which stresses approach the failure strength of the rock.

Accordingly, several micromechanical models have also been developed that attempt to predict such large-strain constitutive behavior, specifically with reference to the onset of brittle failure under compressive loading. Griffith (1924) with modifications by McClintock & Walsh (1962) and Murrell (1963) utilized a theoretical rock model containing a distribution of randomly orientated thin elliptical cracks to derive a failure criterion capable of qualitatively describing the dependence of rock strength on stress state. More recently, a number of stochastic/statistical modeling approaches (summarized in Yuan & Harrison 2006) have been developed for simulating the process of progressive mechanical breakdown of initially intact heterogeneous rocks. However, while the above micromechanical models are selectively capable of qualitatively reproducing many of the phenomenological features associated with elastic-brittle rock deformation both pre- and post-failure (e.g. onset of the brittle-ductile transition, relationships between localized damage and hydraulic flow) collectively they are impractical for the purposes of predicting large-strain plastic rock mechanical properties with sufficient accuracy for petroleum geomechanics modeling purposes. Additional limitations might also include: (i) computational intensity; (ii) lack of sufficient petrographic characterization of required microstructural input parameters; (iii) necessity of core measurements for model calibration purposes; (iv) difficulties associated with upscaling results.

As a direct result of the above perceived deficiencies in theoretical models of large-strain plastic behavior (by comparison with those models developed for effective elastic moduli estimation) most effort has concentrated on generating practical empirical relationships for inferring mechanical properties from knowledge of other more easily measured rock properties. For example, rock strength is frequently inferred from other petrophysical properties routinely derived from geophysical wireline logs, despite the fact that no logs directly measure the actual strength of the logged formation. The rationale behind such predictive relationships is that the same petrographic parameters that notionally control rock strength (such as porosity, mineralogy, clay content, cement content, grain size etc.) also impact other log-derived petrophysical parameters (such as acoustic velocities and dynamic elastic moduli) in a similar manner. That is, the same combination of petrographic parameters that make a particular lithology relatively more compliant (less stiff) and thus slower with respect to the speed of acoustic wave propagation, also decrease its strength (load-bearing capacity) relative to surrounding lithologies.

A plethora of such empirical strength—petrophysical property correlations exist in the literature and are well summarized in Chang et al. (2006). Nearly all proposed formulae utilize a combination of one or more of the following parameters to predict rock strength: (i) P-wave or S-wave acoustic velocities (or the equivalent interval transit times which are directly measured via acoustic logging tools or on core plugs in the laboratory); (ii) dynamic elastic constants (Young's modulus or Poisson's ratio) derived from acoustic velocities (P- & S-waves) and bulk density; (iii) porosity directly measured from core plugs, or calculated from sonic, density, neutron or magnetic resonance logs. While some empirical models work reasonably well for a particular geographic region or specific lithology, considerable scatter in predicted strength indicates that none are sufficiently generic to fit all available data. Also, most current empirical strength—petrophysical property correlations predict only the unconfined compressive strength (rock strength under atmospheric pressure conditions) and therefore ignore the strengthening effect associated with minimum principal stresses elevated above atmospheric pressure conditions.

It is believed that there are no existing techniques that can predict a range of plastic mechanical properties in a diversity of lithologies without recourse to obtaining at least one core sample from the strata of interest for laboratory testing. However, there are multiple relevant technologies for general mechanical properties prediction. A brief review and summary of the limitations of two such technologies for rock strength and compressibility prediction follows next.

Rock Strength Prediction

The mechanical strength of sedimentary rocks is fundamental data input to many geomechanical analyses applied in the petroleum industry. Accurate estimation of compressive rock strength is essential for, amongst others: (i) drilling simulation of penetration rate and drill bit wear (Cooper and Hatherly 2003); (ii) wellbore stability analysis (McLean and Addis 1990); (iii) sand production prediction (Nouri et al., 2006); (iv) constraining in situ stress magnitudes from observations of wellbore failure (Peska and Zoback, 1995).

Deere and Miller (1966) developed a mechanical properties database for a wide range of igneous, metamorphic and sedimentary rocks. Once the data are subdivided on the basis of lithology, individual correlations between static Young's modulus and unconfined compressive strength become apparent for broad rock type classes including sandstones, limestones and shales. Coates and Denoo (1981) utilized these trends to predict formation strength from wireline log data in order to estimate well production rates resulting in formation collapse and sand production. Using Deere and Miller's sandstone and shale lines, Coates and Denoo developed an empirical relationship for estimating unconfined compressive strength from knowledge of Young's modulus (derived from bulk density, compressional and shear acoustic log data) and the fraction of clay in the sandstone (derivable from conventional open-hole log analysis). Mohr-Coulomb cohesive strength is then obtained from the unconfined compressive strength by multiplying by the bulk modulus (again derived from log data). In an analysis of the above technique, Fjaer et al. (1992) show convincingly that the above derivation for cohesive strength is primarily dependent on compressional velocity, such that a 10% change in velocity results in a 46% change in strength estimate. As noted by Fjaer, significant limitations associated with the above technique include: (i) sizeable differences between static (core-derived) and dynamic (log-derived) elastic moduli can result in considerable error when using static correlations to predict strength from elastic moduli calculated from sonic velocities; (ii) as compressional velocity is dependent on applied stress and fluid saturation in addition to rock microstructure, strength predicted using the above technique should be field dependent, that is should vary with subsurface depth and reservoir environment for a constant lithology; (iii) since the lowest strength in the mechanical properties database is ~30 MPa such that the data represent relatively high strength rocks, it is unclear how the empirical correlation will extrapolate to low strength formations; (iv) a constant Mohr-Coulomb friction angle of 30 degrees is assumed in the above analysis, whereas laboratory measured friction angles in equivalent sandstone-to-shale lithologies is known to vary from ~5 degrees to ~50 degrees.

Raaen et al. (1996) summarize a proprietary technique that utilizes a constitutive model describing micromechanical deformation processes, to derive large-strain rock mechanical properties such as rock strength from dynamic (low-amplitude strain) acoustic data. Conceptually the empirical formula relies on quantifying the micromechanisms that give rise to differences between the static and dynamic elastic moduli, such as grain contact crushing, pore collapse and microcrack shear slippage. Raaen et al. contend that, while differences between static and dynamic moduli are partly attributable to fluid effects, the above plastic micromechanisms requiring large strain amplitude for activation account for the majority of static versus dynamic mismatch, as small amplitude dynamic loading resulting from acoustic excitation cannot trigger such mechanisms. The model relies on two sets of input parameters—one set describing micromechanical processes responsible for static versus dynamic mismatch are derived from laboratory measurements and are field independent. The other field-specific set includes formation volumetrics (sand-shale-oil-water) compressional and shear acoustic logs and in situ stress estimates. As the main focus of this technique is to provide sand strength estimation for quantifying solids production in flowing wells, an obvious limitation of the model is an inability to predict the strength of argillaceous, shaly rocks which can often contribute to wellbore stability issues.

Smith and Goldman (1998) describe a patented technique for assaying the compressive strength of rock, primarily based upon a database of laboratory measurements from which strength versus porosity correlations are extracted. While the technique mainly addresses unconfined compressive strength, it can potentially accommodate other factors that impact rock strength, such as confining stress, bedding plane dip and temperature. Due to the predictive methodology underlying the technique, ideally calibration involving laboratory testing of "pure lithologies" (clean sandstone and/or shale) recovered from the well of interest is required, however lithologically similar samples (perhaps from offset wells) would suffice. The technique has limitations when used to predict strength in "mixed lithologies" such as shaly sandstones or sandy shales, as it relies on a weighted average of the pure end member components which can lead to significant predictive uncertainty.

Birchwood (2008) details a patented technique for managing a drilling operation in a multicomponent particulate system (specifically a sediment-hydrate system). The technique involves obtaining petrophysical, in situ stress and geophysical properties of a sedimentary system of interest, constructing correlations between these properties and various elastoplastic properties of the sedimentary system (e.g. dilation angle, unconfined compressive strength, cohesion hardening parameters etc.) based on micromechanical models governing the deformation of granular materials, and using these correlations to estimate the elastoplastic properties of the sedimentary system of interest. Limitations associated with this method are as follows: (i) the method involves obtaining measurements of one or more static drained elastoplastic properties from the sedimentary system of interest (ii) the micromechanical model involves diverse microstructural parameters (such as particle coordination number, grain-size and grain-to-grain friction coefficients) which are difficult to characterize without sampling the strata of interest; (iii) the micromechanical model may not be applicable to diverse lithologies such as carbonates and shales.

Rock Compressibility Prediction

The compressibility of reservoir formations (specifically the uniaxial pore volume compressibility, or "UPVC") is a fundamental mechanical rock property utilized in many reservoir engineering calculations including reserves estimates, reservoir performance and production forecasting. For example, ignoring UPVC in material balance calculations can result in over estimation of oil-in-place and prediction of excessive volumes of water influx (Hall, 1953). In undersaturated reservoirs (fluid pressures in excess of the bubblepoint), liquid and formation (UPVC) compressibilities represent significant proportions of the total compressibility of the reservoir system and therefore strongly impact the prediction of reservoir performance. As fluid properties are generally well constrained, uncertainty in UPVC directly contributes to inaccuracies in material balance and simulation results (Carlson, 2003). Pressure decline above the bubblepoint can be very rapid, such that a substantial amount of recovery can occur prior to obtaining core and measuring mechanical rock properties. Of equal importance is the uniaxial bulk volume compressibility, or "UBVC," which is used in reservoir compaction and surface subsidence calculations and for well operability limit modeling (e.g. Guenther et al., 2005). Rock (both UPVC and UBVC) compressibilities can be accurately quantified only via geomechanical measurements on recovered core in which care is taken to simulate in situ stress magnitudes and boundary conditions (e.g. Lachance and Andersen, 1983; Rhett and Teufel, 1992). To accommodate this need for data early in the production lifecycle, a technique for predicting rock compressibility from geophysical wireline logs offers considerable advantage. Further, discrete core measurements are rarely obtained in sufficient number to overcome between-sample data variability.

In the petroleum industry there are two basic laboratory techniques employed to determine pore compressibility magnitude: (i) hydrostatic compression giving HPVC; (ii) uniaxial strain boundary conditions giving UPVC. While hydrostatic testing is much simpler to perform in the laboratory, in general in situ reservoir compaction is better approximated by uniaxial strain loading (one-dimensional vertical compaction with zero expansion or contraction in the radial direction). Theoretically, HPVC is related to UPVC through a "uniaxial strain correction factor, USCF". For elastic (small strain, recoverable) deformation, Teeuw (1981) showed that USCF is a function of Poisson's ratio, v. For plastic (large strain, irrecoverable) deformation, it can be shown that USCF is a function of the ratio of horizontal-to-vertical effective stress change, $k_O$. In the absence of geomechanical measurements of UPVC on recovered core, normal oilfield practice is to utilize pore compressibility HPVC versus porosity correlations derived from extensive databases of hydrostatic core measurements. For example Newman (1973) provided correlations for siliciclastic reservoir rocks, subdivided into consolidated, friable and unconsolidated sand lithotypes.

Figure 1:
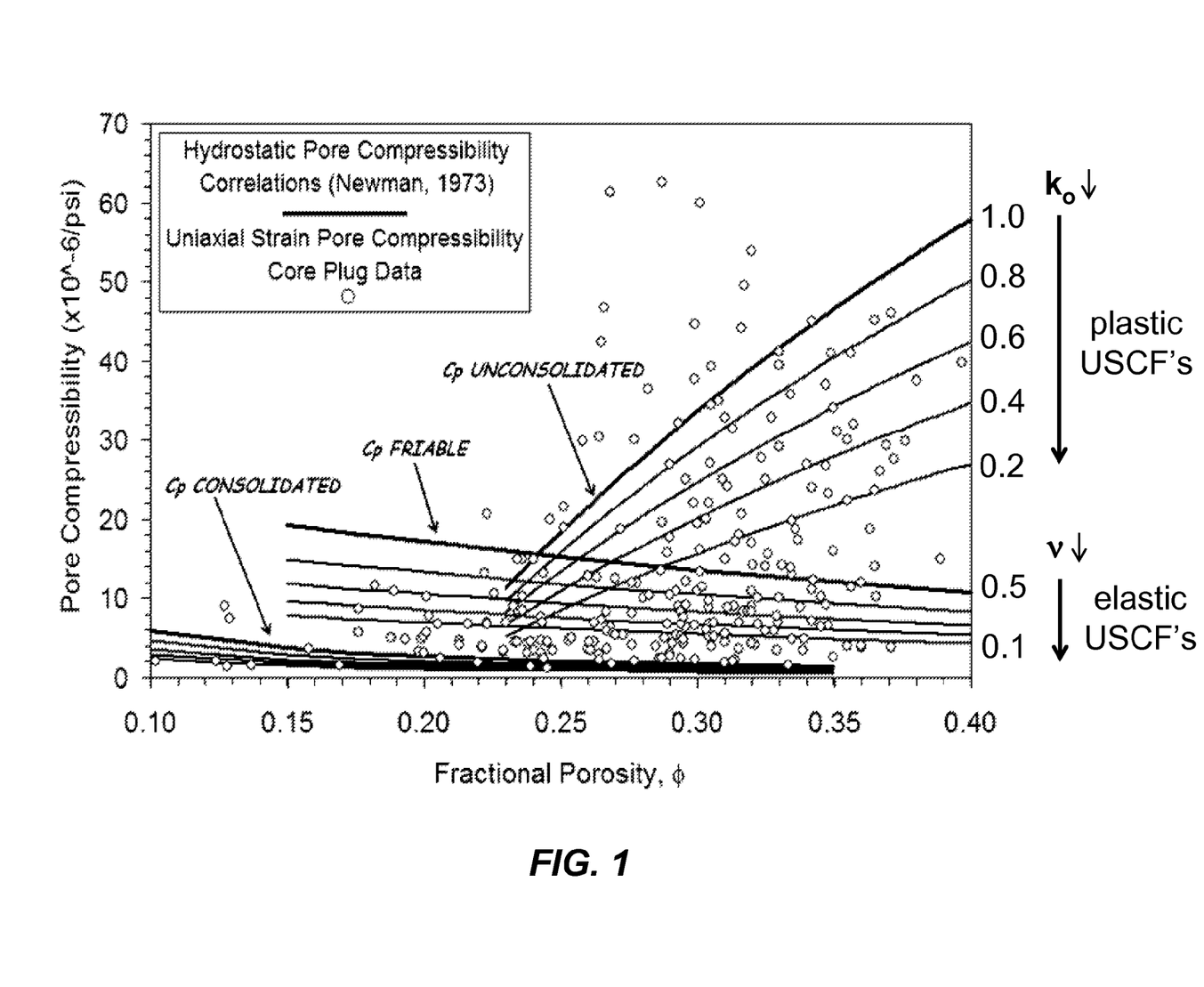
FIG. 1 is a plot of uniaxial strain pore volume compressibility versus fractional porosity core measurements, with Newman's (1973) hydrostatic pore volume compressibility empirical correlations for unconsolidated, friable and consolidated sands superimposed for ranges of elastic and plastic uniaxial strain correction factors (USCF's)

FIG. 1 is a plot of uniaxial pore volume compressibility, UPVC, as a function of fractional porosity, $\phi$ (both measured at initial in situ reservoir stress conditions prior to production) derived from ~three hundred uniaxial strain tests performed by the present inventors on siliciclastic reservoir rocks. It is evident from the data point scatter that UPVC and porosity are not highly correlated. Newman's HPVC predictors (the curves in the drawing) for unconsolidated, friable and consolidated sands are superimposed on the uniaxial core data with a range of admissible elastic and plastic USCF's. A limitation of this technique is apparent from FIG. 1 in that, without knowing the generic lithotype (consolidated versus friable versus unconsolidated sand) and the appropriate USCF, porosity does not yield a reliable prediction of UPVC. Accordingly material balance and simulation results above the bubblepoint could not be considered accurate if formation compressibility is based upon such correlations as opposed to core measurements.

Khatchikian (1995) outlines a methodology for deriving UPVC directly from geophysical wireline logs. Dynamic "wet" uniaxial bulk compressibility, UBVC is first calculated from the compressional and shear slowness and the bulk density logs using standard dynamic moduli formulations (e.g. Mavko et al., 1998). Dynamic 'wet" UBVC is then converted to an equivalent static "dry" value by removing fluid stiffness effects through low frequency Biot-Gassmann substitution (e.g. Mavko et al., 1998). Finally, UPVC is computed from the log-derived "dry" UBVC, the matrix compressibility and the porosity according to relationships given by Zimmermann (1991). While Khatchikian's methodology is valid for estimating essentially elastic UPVC at reservoir stress conditions (as sonic logs measure formation stiffness resulting from low-amplitude, high-frequency elastic deformation) it is incapable of predicting compressibility associated with any significant component of large-strain plastic deformation.

Ong et al. (2001) and Wolfe et al. (2005) describe the same wireline log-based methodology for determining UPVC. For input, the method requires static mechanical properties that characterize the rock strata of interest. Both Ong and Wolfe use the previously described micromechanical constitutive model of Raaen et al. (1996) to generate the equivalent static mechanical properties from dynamic log data. From previously established relationships between porosity, bulk density, mineralogy, dynamic properties and grain contact, sliding crack and dilatancy parameters, the micromechanical model uses fluid saturations, lithology, porosity, density and shear and compressional slowness to construct a "virtual core sample." Knowledge of the in situ stress and pore pressure fields are required to ascertain the initial confining conditions to apply to each virtual core sample. The constitutive behavior (and thus static mechanical properties) of each virtual core sample representing the strata of interest is then examined through simulated hydrostatic and triaxial loading. Incremental stresses and strains are calculated and static loading stress-strain curves constructed. Static mechanical properties including rock strength, elastic moduli and compressibilities are then deduced from the simulated stress-strain curves. Finally, bulk compressibility measured over the linear elastic portion of the simulated triaxial deviatoric stress-strain curve (between 5% and 75% of peak strength) is converted to pore compressibility using Zimmerman's (1991) transforms, which in turn is converted to an equivalent UPVC using the theoretical elastic solution of Teeuw (1981). Thus uniaxial strain pore volume compressibility is derived from a micromechanical constitutive model used to simulate triaxial compression of a virtual core specimen representing the strata of interest. Limitations of this technique are as follows: (i) as the method requires simulated loading of virtual core samples representing each strata of interest, it is impractical for wells penetrating lithologically diverse strata; (ii) propagation of error associated with micromechanical modeling of static mechanical properties could result in significant error in derived UPVC's; (iii) ideally the micromechanical model should be calibrated against laboratory testing of recovered core; and (iv) knowledge of the in situ stress and pore pressure fields may not be practical, particularly in an exploration setting.

SUMMARY OF THE INVENTION

In one embodiment, the invention is a method for predicting a plastic mechanical property in a selected subsurface rock formation without lab testing of core samples from said formation, comprising using one or more empirical predictive algorithms, based on a database of mechanical and associated petrophysical rock properties developed from laboratory testing of core samples from other formations with varying lithologies, to predict a plastic mechanical property from one or more measured or estimated petrophysical properties of the selected formation.

BRIEF DESCRIPTION OF THE DRAWINGS

The present invention will be better understood by referring to the following detailed description and the attached drawings in which.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The invention is a method for predicting mechanical properties used in the description of large-strain plastic deformation for any subsurface rock strata of interest. The invention uses a pre-established database of core measurements to develop novel predictive algorithms relating mechanical rock properties to associated petrophysical rock properties generated from (for example) geophysical wireline logs, or alternatively from any other method such as analysis of drilling cuttings or cores, inference from geologic models, or seismic inversion. Each predictive algorithm is specific to a particular plastic mechanical property (such as rock strength or rock compressibility) and a particular range of associated petrophysical input parameters (such as porosity and/or clay content and/or acoustic travel time). A desired plastic mechanical property can thus be calculated for any subsurface strata of interest using measurement of the pertinent petrophysical properties of the subsurface strata of interest as input to the appropriate predictive algorithm. As long as the subsurface rock strata of interest are broadly lithologically similar to a particular lithology characterized in the mechanical properties database, then a pre-established predictive algorithm can be used to generate subsurface mechanical properties representative of the rock strata of interest without incorporation of core measurements from the rock strata of interest within the mechanical properties database. For example, if the pre-established mechanical properties database contains only core measurements conducted on carbonate rocks, then it cannot be used to generate subsurface plastic mechanical properties in sandstones, and vice versa.

Figure 2:
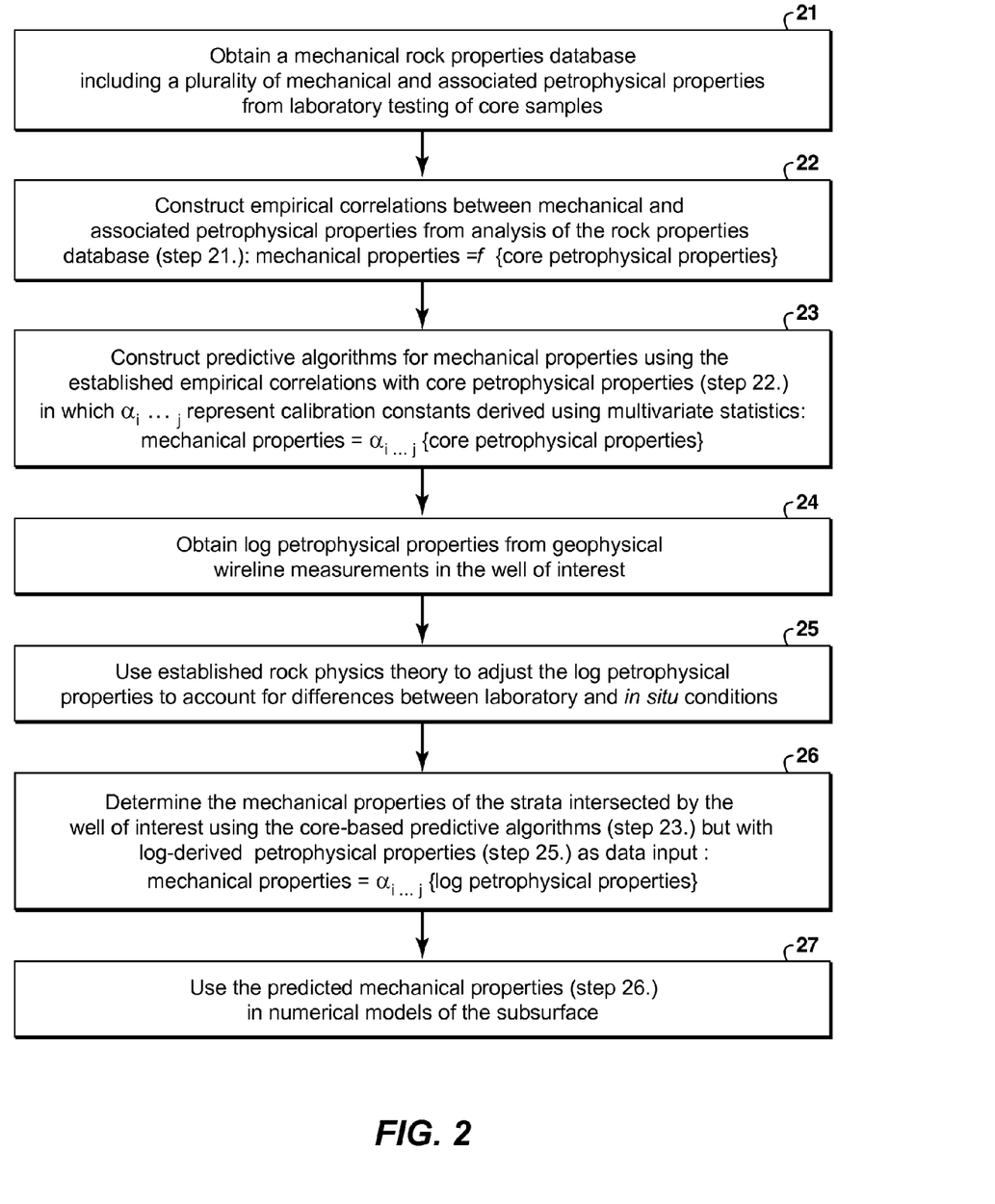
FIG. 2 is a flow chart showing basic steps in one embodiment of the present inventive method.

In one embodiment of the present invention, as shown in the flow chart of FIG. 2, the method includes the following steps. Step 21 is obtaining a mechanical properties database including a plurality of mechanical and associated petrophysical properties from laboratory testing of core samples. Step 22 is generating empirical correlations between mechanical and associated petrophysical properties via interrogation of the rock properties database. At step 23, predictive algorithms are generated from the empirical observations using a multivariate statistical approach. At step 24, petrophysical properties are obtained from the rock strata of interest through, for example, geophysical wireline logging of a well penetrating the rock strata of interest and/or analyses of drilling cuttings obtained from a well penetrating the rock strata of interest. At step 25, established rock physics theory is used to adjust the petrophysical properties derived for the rock strata of interest to account for any differences between laboratory conditions and in situ subsurface conditions associated with the rock strata of interest. At step 26, the desired mechanical properties are calculated for the rock strata of interest using the appropriate pre-determined predictive algorithms with petrophysical properties measured from the rock strata of interest as data input. At step 27, the predicted mechanical properties for the rock strata of interest are used in numerical models of the subsurface.

By comparison with current technologies, the above process is not specific to any geographic region, geological environment or subsurface depth interval, nor is it constrained to a specific lithology or plastic mechanical property. Advantageous features of the present invention include: (i) no core measurements from the subsurface rock strata of interest are required for calibration purposes in order to predict associated plastic mechanical properties; (ii) the predictive technique is not dependent on a micromechanical model in order to simulate constitutive stress-strain behavior; (iii) no complex microstructural characterization of the subsurface rock strata of interest is necessary; (iv) mechanical properties prediction is possible without knowledge of either the in situ stress field or the pore pressure magnitude.

A key part of the present invention is the mechanical properties database (step 21) used to generate the predictive methodology. In general, the larger and more comprehensive this database is, the better the results of the inventive method. The mechanical properties database should comprise a wide spectrum of sedimentary lithologies most often encountered within hydrocarbon reservoir environments and should preferably incorporate laboratory measurements conducted on both recovered core from deep subsurface reservoirs and surface outcrop analogs. In addition to a diversity of geomechanical parameters, the database rocks preferably are extensively characterized with regard to petrologic and petrophysical properties. Preferably the mechanical properties database incorporates geomechanical measurements made using a variety of test protocols (such as specific loading paths designed to mimic in situ stress conditions and data acquisition techniques and calculation algorithms designed to maximize rock sample-to-equipment noise ratios) which can significantly aid in the establishment of empirical relationships relating geomechanical and petrophysical properties. Also, comparison of database petrophysical properties (such as clay content, mineralogy, acoustic velocities etc.) derived from core measurement versus subsurface geophysical wireline logs has enabled rock physics theory to be used in the invention (step 25) to decrease uncertainty in subsurface mechanical properties prediction.

Examples of suitable (for step 23) predictive algorithms for triaxial compressive strength and rock compressibility derived from a mechanical properties database are presented next, and they are utilized in a test application of the present inventive method to predict subsurface variation in the mechanical parameters of lithologically diverse strata of interest using only petrophysical properties generated from geophysical wireline logs as input to the algorithms.

With reference to the flow chart of FIG. 2, starting from a mechanical rock properties database, including a plurality of mechanical and associated petrophysical properties derived from laboratory testing of core samples (Step 21), interrogation of the mechanical properties database (Step 22) results in the following example empirical observations:

(i) Increasing rock strength (from triaxial compression testing) is best correlated with decreasing porosity (derived from routine core analysis) and decreasing fine-grained matrix component (derived from petrographic thin section analysis).

(ii) Increasing rock compressibility (both UPVC and UBVC at initial reservoir stress conditions derived from uniaxial strain compaction testing) is best correlated with decreasing effective elastic moduli (at initial reservoir stress conditions also derived from uniaxial strain compaction testing).

Based on scrutiny of the database used in the course of the present invention, empirical correlation (i) above is believed to have good validity for all siliciclastic rocks from clean sandstones to shaly sandstones to shales, and empirical correlation (ii) is believed to have good validity from unconsolidated to friable to well-cemented siliciclastic reservoir rocks. Persons skilled in the technical field may readily deduce other correlations upon analysis of their own rock properties databases.

Construction of new predictive algorithms (Step 23) using multivariate statistical analysis of the above empirical observations is detailed below. An approach for predicting compressive strength in siliciclastic rocks is disclosed that is believed to be new. The predictive algorithm is sufficiently generic that it can be applied throughout sandstone-to-shale sequences. It is simple and ideally suited for rock strength prediction in data-sparse regions where, for example, no acoustic logs or associated core measurements are available for calibration purposes. The technique is not limited to unconfined compressive strength prediction, but rather predicts the full failure envelope in which shear strength increases non-linearly with increasing normal stress. In one embodiment of that inventive technique, the siliciclastic database rocks are first subdivided into three distinct groups following a petrophysical classification scheme proposed by Vernik and Nur (1992). With increasing fine-grained matrix component: clean sandstones (arenites)$\leq$15% $V_{matrix}$; 15% $V_{matrix}$<shaly sandstones (wackes)<37% $V_{matrix}$; shales$\geq$37% $V_{matrix}$, where "$V_{matrix}$" represents the fine-grained matrix volume fraction as determined from thin-section point counting. Utilizing the micro-geometrical mixing law of Marion et al. (1991) for two-phase aggregates of coarse- and fine-grained components, it is apparent that these petrophysical classes display markedly different load-bearing characteristics. Arenites are grain-framework supported with clay being dispersed within the pore space of load-bearing sand grains, shales are clay-matrix supported with sand grains dispersed within fine-grained matrix material and wackes represent a transitional microstructure between arenites and shales. Next, the "critical porosity" concept proposed by Nur et al. (1998) is used to establish a hypothetical "zero strength condition" for the siliciclastic database rocks. Nur suggested that the critical porosity "$\phi_C$" separates load-bearing sediments at lower porosities ($\phi<\phi_C$) from suspensions at higher porosities ($\phi>\phi_C$). Equating zero strength with critical porosity, one might expect $\phi_C\sim$37% for sandstones (equivalent to unconsolidated sand grains) and $\phi_C\sim$60% for shales (equivalent to flocculated clays). If "$\phi$" is the porosity as measured on the database rocks (at ambient pressure/temperature conditions), then mechanical strength should increase systematically as ($\phi_C-\phi$) increases. Finally, mechanical rock strength is defined as the peak shear strength "$\tau$" prior to brittle shear fracture for a given value of normal stress "$\sigma_n$", such that shear strength and normal stress are related by a function characteristic of the rock type. Analyses of database triaxial compression test results indicates that arenites and wackes may be best represented by the nonlinear Hoek-Brown failure criterion (Hoek & Brown, 1980) whereas shales may be best represented by the linear Mohr-Coulomb failure criterion (Jaeger & Cook, 1979).

Figure 3A:
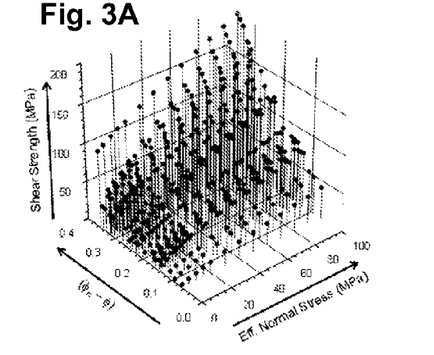
FIGS. 3A-F show empirical correlations of shear strength ($\tau$) as a function of normal stress ($\sigma_n$) and porosity difference ($\phi_c - \phi$) for: (A) arenites, (B) wackes, (C) shales and predictive algorithms for (D) arenites, (E) wackes, and (F) shales.
Figure 3B:
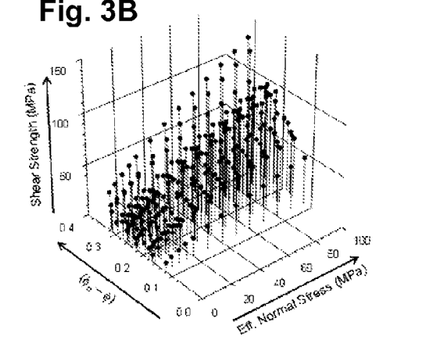
Figure 3C:
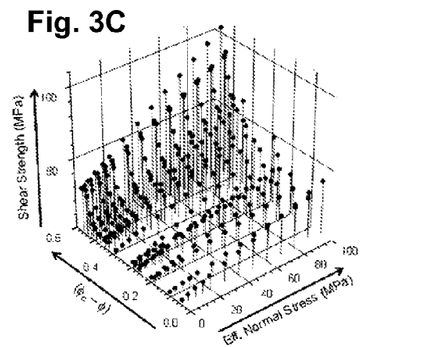
Figure 3D:
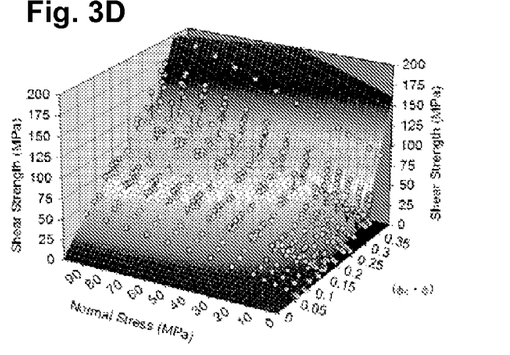
Figure 3E:
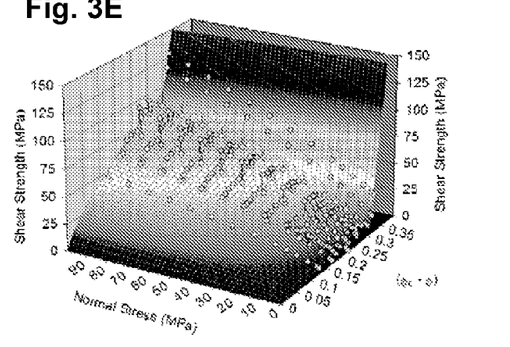
Figure 3F:
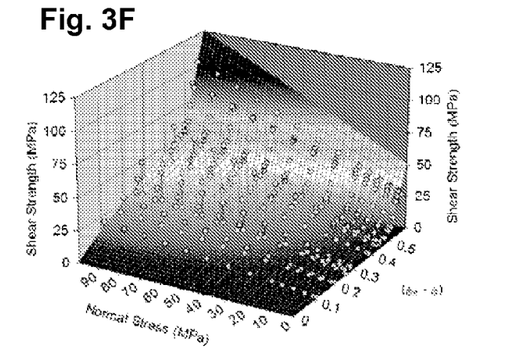

From the empirical correlations depicted in FIGS. 3A-C, it is apparent that shear strength "$\tau$" increases systematically with increasing porosity difference ($\phi_C-\phi$) for constant values of normal stress "$\sigma_n$". However, specific "$\tau$" versus ($\phi_C-\phi$) versus "$\sigma_n$" relationships are markedly different from arenite to wacke to shale. As the critical porosity fraction is fixed ($\phi_C$=0.37 for sandstones and $\phi_C$=0.60 for shales), it is evident that ambient porosity fraction "$\phi$" has first order control on rock strength for a given value of normal stress, despite the fact that other petrographic parameters such as mineralogy, grain-size and cementation are also varying within each petrophysical subclass. Sandstones (both arenites and wackes) both exhibit a transition in the rate of change of shear strength with porosity difference at an ambient porosity fraction, $\phi$=0.06, while shales exhibit a similar transition but at an ambient porosity fraction, $\phi$=0.10. From the above observations derived from core measurements, the following new predictive algorithm for rock strength was developed as depicted graphically in FIGS. 3D-F:

$$z=(\alpha_0 y+\alpha_1)x^{[\alpha_2+\alpha_3 exp(-\alpha_4 y)]} \text{ for } x\leq\beta \quad (1)$$

$$z=(\alpha_5 y+\alpha_6)x-(\alpha_7 y+\alpha_8) \text{ for } x\geq\beta \quad (2)$$

This algorithm for mechanical strength is believed to have universal applicability for all siliciclastic rocks (sandstone to shale).

Figure 4A:
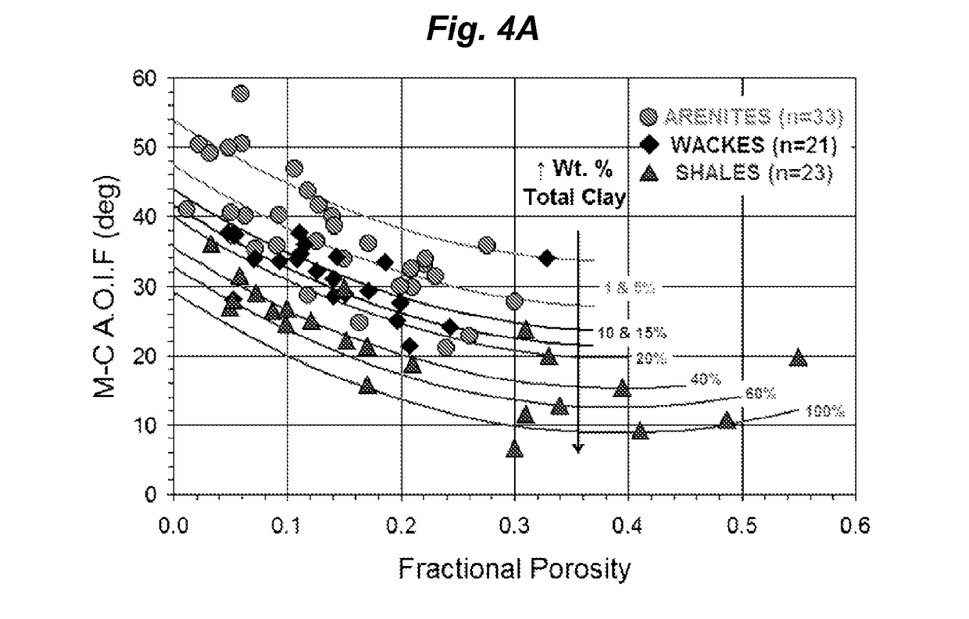
FIGS. 4A-B show empirical correlations (points) and predictive algorithms (lines) for the Mohr-Coulomb strength parameters internal friction angle (FIG. 4A) and cohesion (FIG. 4B) as a function of porosity and weight percent total clay.
Figure 4B:
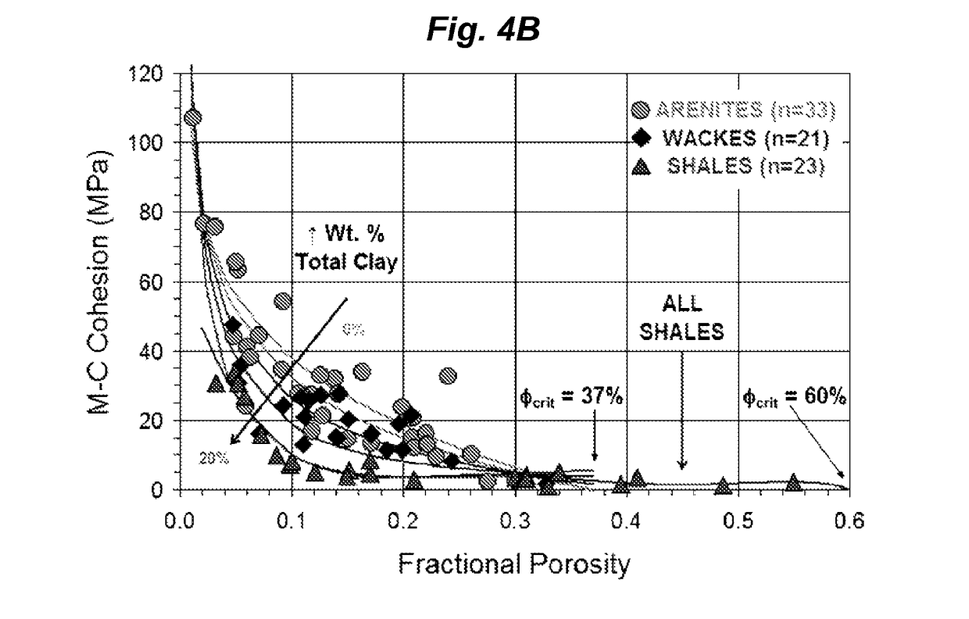

In equations (1) and (2) above, x=porosity difference ($\phi_C-\phi$), y=normal stress "$\sigma_n$", z=shear strength "$\tau$", $\alpha_0 \ldots \alpha_8$=arenite-, wacke- and shale-dependent empirical constants and $\beta$=arenite-, wacke- and shale-dependent predictor cutoff limits. Thus for sandstones (arenites and wackes) $\beta$=(0.37−0.06)=0.31 and for shales $\beta$=(0.60−0.10)=0.50. As all empirical $\alpha$-parameters are predetermined for each petrophysical subclass using statistical analyses of the existing mechanical rock properties database, shear strength can be predicted for any desired range of normal stress (within the limits $0 \leq \sigma_n$ (MPa)$\leq 100$) provided the ambient porosity "$\phi$" and appropriate petrophysical subclass (arenite, wacke or shale) of the subsurface lithology of interest are known. Alternatively, an equivalent process for performing steps 21 to 23 in FIG. 2 can be used to generate predictive algorithms for the Mohr-Coulomb strength parameters (angle of internal friction and cohesion) as shown in FIG. 4 again, with each predictive algorithm having a unique set of input petrophysical properties (porosity and weight percent total clay in this case) and associated $\alpha$-parameters again determined from multivariate statistical analysis of the database-derived empirical correlations.

To illustrate the versatility of this approach, the same process has been used to generate a new predictive algorithm for plastic rock compressibility (UPVC and UBVC) at initial reservoir stress conditions ("IRSC") in siliciclastic reservoir rocks ranging from unconsolidated sands to well-cemented sandstones. The simple predictive algorithm utilizes standard geophysical wireline logs as data input and does not require associated core measurements for calibration purposes or any estimate of the in situ stress field. The predictive algorithm relates plastic rock compressibility to static elastic modulus and is derived from a mechanical rock properties database of core compaction measurements performed under uniaxial strain boundary conditions.

Figure 5:
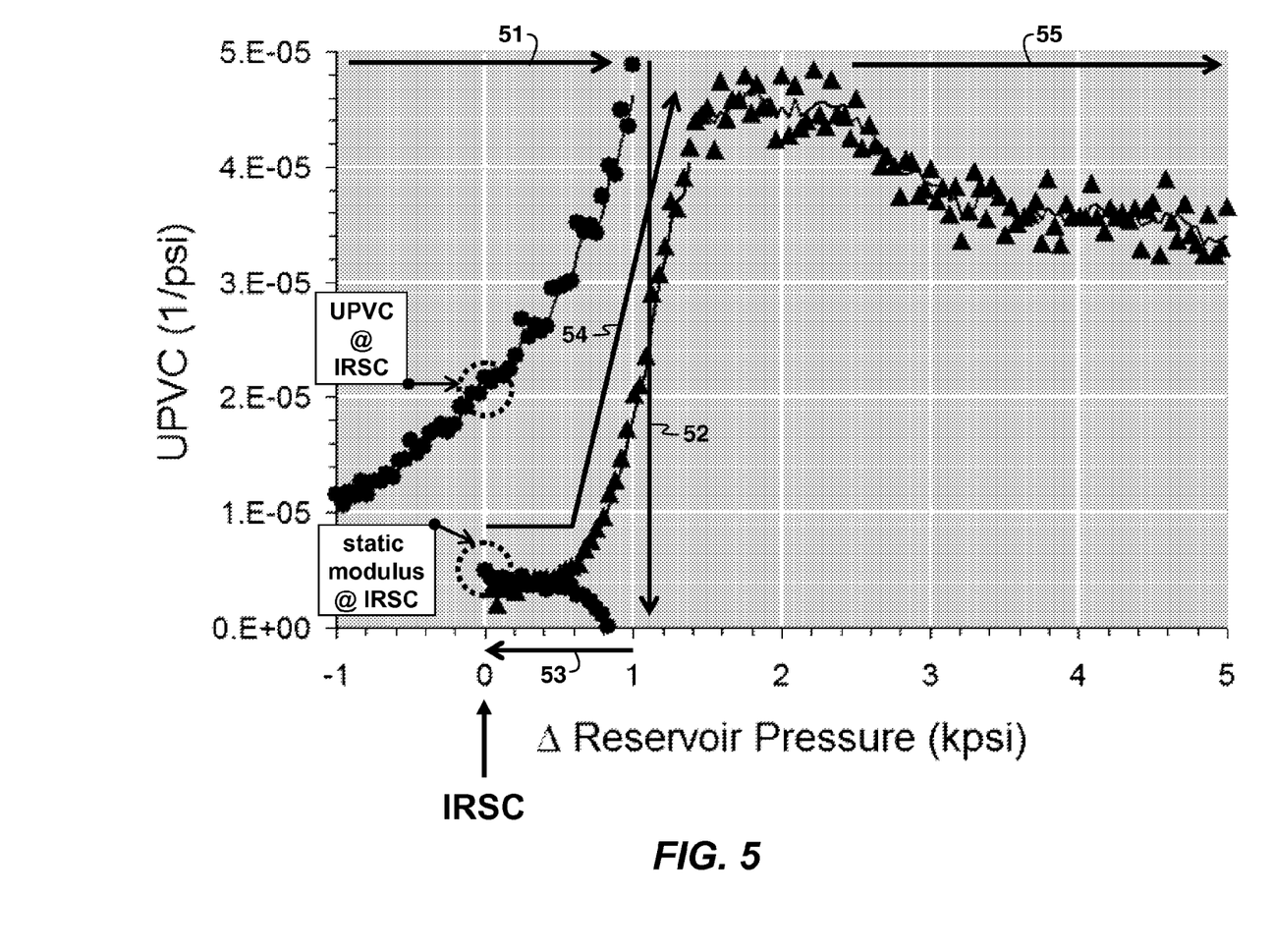
FIG. 5 shows laboratory core measurement of pore volume compressibility under uniaxial strain boundary conditions (UPVC) as a function of change in reservoir pressure.
Figure 6:
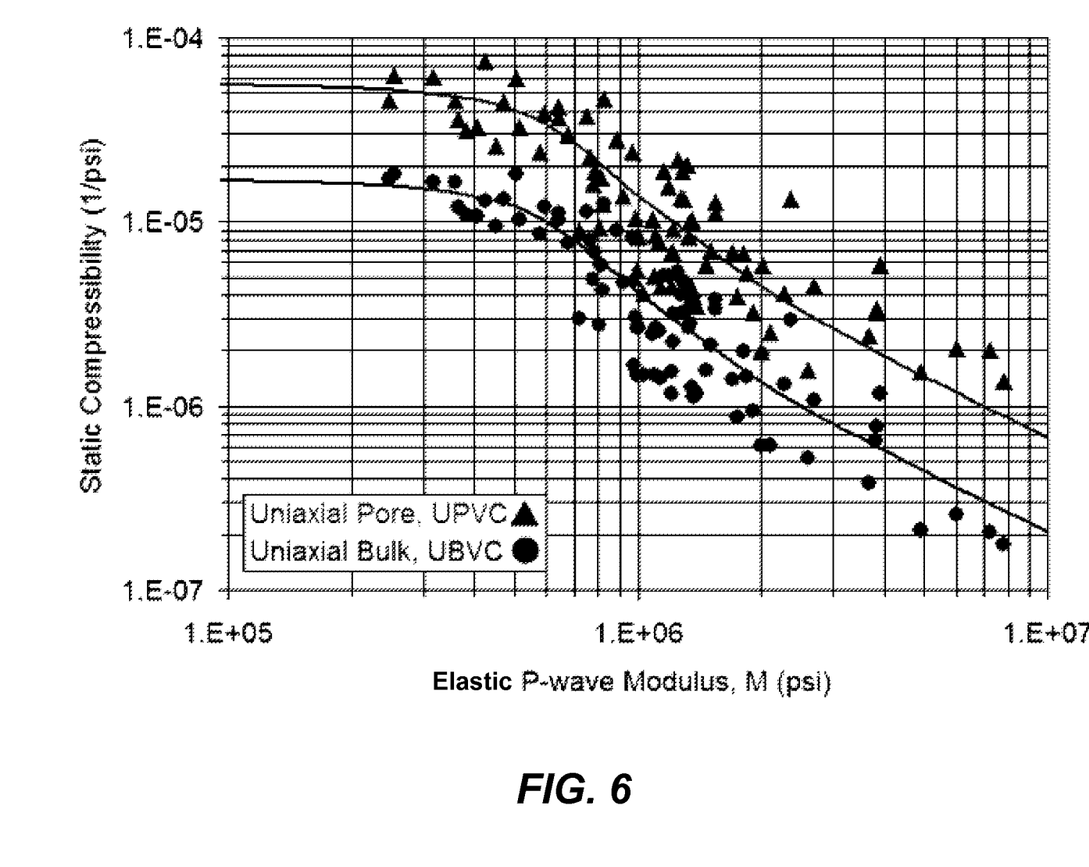
FIG. 6 shows a symmetric transition function predictive algorithm for UPVC and UBVC as a function of elastic P-wave Modulus M.

The rock compressibility algorithm is generated from core measurements derived from a specialized laboratory procedure involving an unload-reload loop around IRSC as shown in FIG. 5. The unload-reload loop around initial reservoir stress conditions (IRSC) enables UPVC on loading cycle 51 to be correlated with static modulus measured on unloading cycle 53. First the recovered reservoir core sample is loaded under uniaxial strain boundary conditions through IRSC to simulate a 1 kpsi reduction in reservoir pore fluid pressure (cycle 51) associated with depletion. The sample is then unloaded under uniaxial strain boundary conditions back to IRSC to simulate a 1 kpsi increase in reservoir pore fluid pressure (cycles 52 and 53) associated with reinjection. The observed reduction in UPVC over cycle 52 corresponds to the transition from plastic loading to elastic unloading, and the static elastic moduli are quantified at the end of cycle 53 corresponding to IRSC. The sample is then reloaded over cycles 54 and 55 to simulate in this instance a subsequent 5 kpsi pore pressure decline. Both uniaxial pore (UPVC) and uniaxial bulk (UBVC) compressibility at IRSC can be predicted from either the elastic shear (G) or elastic P-wave (M) modulus using a symmetric transition function predictive algorithm as shown in FIG. 6:

$$C = \frac{\alpha_0}{\pi}\left[\arctan\left(\frac{\Psi - \alpha_1}{\alpha_2}\right) + \frac{\pi}{2}\right] \quad (3)$$

where "C" represents either uniaxial pore or uniaxial bulk compressibility (UPVC or UBVC), "$\Psi$" represents either shear or P-wave modulus (G or M) and "$\alpha_0$", "$\alpha_1$" and "$\alpha_2$" are compressibility- and moduli-specific empirical parameters again derived from multivariate statistical analysis of the data in FIG. 6. Here "$\alpha_0$" controls the transition magnitude or height, "$\alpha_1$" the transition midpoint (the $\Psi$-value where $C=C_{min}+0.5*C_{range}$) and "$\alpha_2$" the transition width. As G- and M-moduli can be directly evaluated from geophysical wireline logs knowing the bulk density and shear and compressional slowness respectively:

$$G = \rho_b V_S^2 \quad (4)$$

$$M = \rho_b V_P^2 \quad (5)$$

where "$\rho_b$" is the bulk density and "$V_S$" and "$V_P$" the shear- and compressional-velocity respectively, substitution of elastic moduli as calculated from equations (4) and (5) directly into equation (3) with the appropriate $\alpha$-parameters therefore allows calculation of either uniaxial pore or uniaxial bulk compressibility directly from geophysical wireline data input.

Having derived predictive algorithms for plastic mechanical properties (specifically rock strength and compressibility), it will now be illustrated how equivalent mechanical properties are generated for any subsurface strata of interest using only wireline geophysical logs as data input. The subsurface strata of interest need only be broadly lithologically similar to the database rocks used to generate the particular predictive algorithm, such that no direct geomechanical core measurements relating to the subsurface strata of interest are required in order to predict the relevant mechanical properties.

With reference to FIG. 2, first petrophysical properties pertaining to the subsurface strata of interest must be derived from geophysical wireline measurements (Step 24). With regard to rock strength prediction utilizing the algorithm detailed in Equations (1) and (2), the main input petrophysical parameters are lithology ($\beta$) and porosity (x). The following process may be used for the prediction of rock strength (sandstone-to-shale) from geophysical log- and/or core-derived petrophysical data; i.e. the following is a more detailed description of how steps 24 (items 1 and 2 below) and 26 (items 3-5) may be performed in one embodiment of the present inventive method to predict rock strength.

1. Utilizing all available data including core, mud logs (cuttings), offset wells and geophysical wireline logs—determine the lithology (arenite versus wacke versus shale petrophysical subclass) of the interval of interest.
2. Again, utilizing all available data as above—determine the total porosity "$\phi$" of the interval of interest.
3. Calculate the porosity difference ($\phi_C-\phi$) for the interval of interest and compare with the predictor cutoff limit, "$\beta$" to determine if Equation (1) or Equation (2) should be used for rock strength prediction. From lithology determined in stage 1 above, use the appropriate critical porosity ($\phi_C=0.37$ for sandstones and $\phi_C=0.60$ for shales) and subtract the porosity determined in stage 2 above. If ($\phi_C-\phi$) is $\leq\beta$, use Equation (1), if ($\phi_C-\phi$) is $\geq\beta$, use Equation (2).
4. Substitute the porosity difference ($\phi_C-\phi$) for "x" in the appropriate strength predictor as determined in stage 3 above. Substitute a desired normal stress "$\sigma_n$" magnitude for "y" in the appropriate strength predictor and calculate "z" representing an equivalent shear strength "$\tau$".
5. Repeat stage 4 above with new values of normal stress in the range, $0 \leq \sigma_n$(MPa)$\leq 100$ until the complete ($\sigma_n$, $\tau$) curve has been generated for constant ($\phi_C-\phi$).

Figure 7:
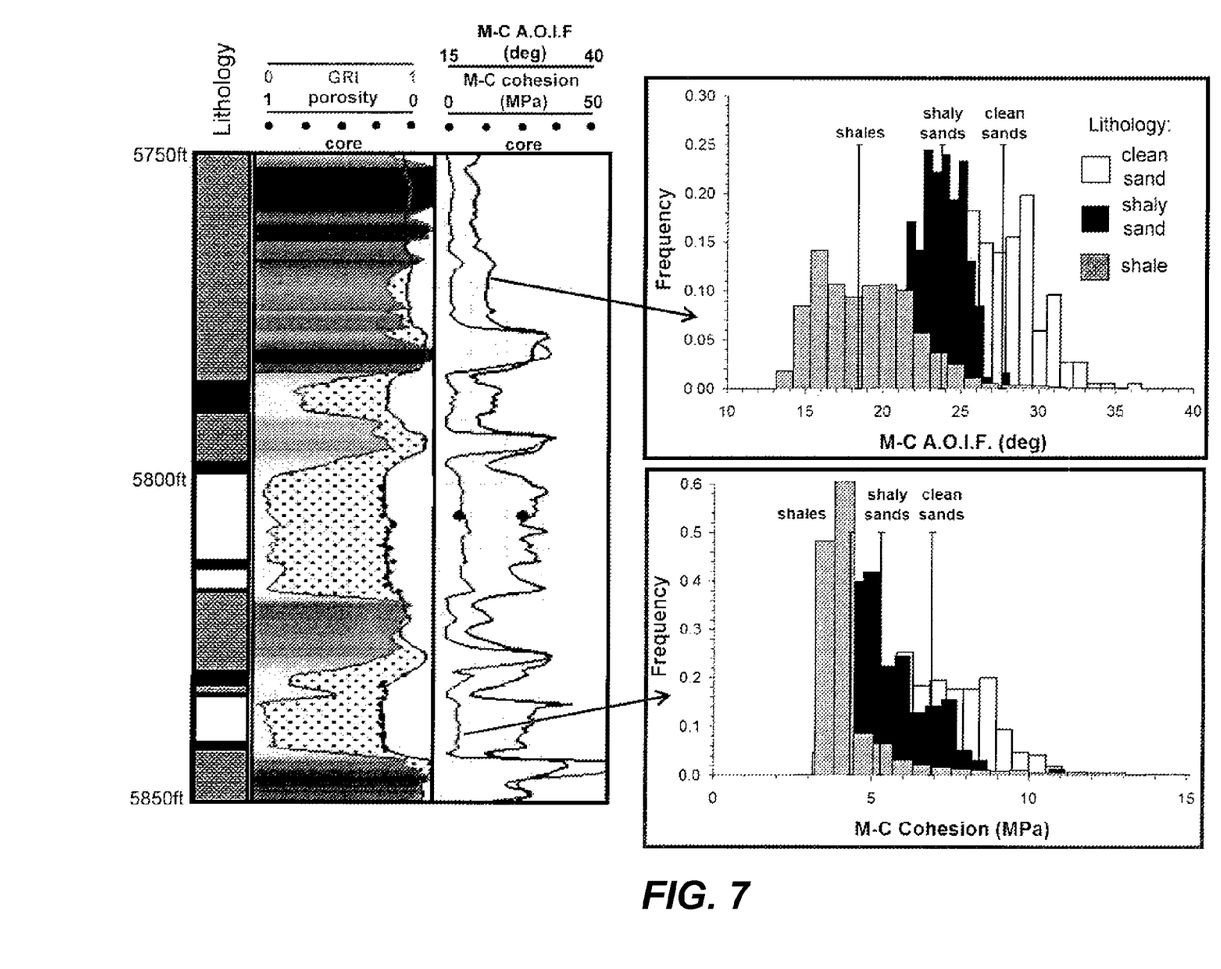
FIG. 7 shows an application of core-based predictive algorithms for Mohr-Coulomb cohesion and angle of internal friction to log-derived petrophysical properties (porosity, weight percent total clay), and histograms showing Mohr-Coulomb parameters for arenite, wacke and shale lithologies over the logged interval.

With reference to FIG. 2, rock physics theory can be used to adjust the log-derived petrophysical properties to better match the equivalent petrophysical properties in the rock mechanics database, thus improving the prediction of mechanical parameters in the subsurface strata of interest (Step 25, which is optional, but preferred). For rock strength prediction as detailed above, the principal mismatch between database core measurements and log-derived petrophysical properties potentially rests with lithology definition, primarily related to differences between shale volume estimation from gamma ray logging and weight percent clay estimated from X-ray diffraction analysis of core samples. As noted by Bhuyan and Passey (1994) the principal error in clay estimation from logs stems from the assumption that shales are composed of 100% clay, whereas analytical studies show that "typical shales" are more often composed of 50-70% clay, 25-45% silt- and clay-sized quartz, and 5% other minerals including feldspars and carbonates. As non-clay minerals in shale do not commonly affect the total gamma-ray count or neutron-density log separation, the estimation of weight percent clay can therefore be corrected by multiplying the GRI (gamma ray index) by a factor equivalent to the average weight percent clay of typical shales adjacent to the zone of interest. In FIG. 7, predictive algorithms for Mohr-Coulomb angle of internal friction and cohesion as illustrated in FIG. 4 are used to estimate strength parameters from log-derived porosity and weight percent total clay in a subsurface sand-shale sequence. Here weight percent total clay is derived by multiplying the GRI by 0.6 following Bhuyan and Passey resulting in much improved strength prediction.

Subsurface rock compressibility prediction is particularly reliant on rock physics-based adjustment (Step 25 in FIG. 2) in order to properly account for potential differences between static (core-derived) and dynamic (log-derived) elastic moduli. The following process may be used for the prediction of plastic rock compressibility (unconsolidated sands-to-cemented sandstones) from geophysical wireline log data input; i.e. the following is a more detailed description of how steps 24-26 may be performed in one embodiment of the present inventive method to predict rock compressibility.

1. If a shear sonic log is available, use the interval transit time, $\Delta t_S$ (where $V_S = 1/\Delta t_S$) and bulk density log, $\rho_b$, to calculate the dynamic shear modulus, G, from Equation (4) for the depth interval of interest. (Step 24)
2. Setting "G" calculated from stage 1 equal to "$\Psi$" in Equation (3), use that equation's symmetric transition function with the appropriate $\alpha_0$, $\alpha_1$ and $\alpha_2$ empirical constants to calculate the equivalent plastic rock compressibility (either UPVC or UBVC). (step 26)

Step 25 is not needed for shear log data, but is recommended for compressional log data. If only a compressional sonic log is available, numerical fluid substitution must first be performed in order to calculate a dry-equivalent P-wave modulus, $M_{dry}$, as dynamic loading associated with acoustic excitation induces pore pressure change which tends to resist compression and thus stiffen the rock. In this case, steps 24-26 may be described by:

3. If a compressional sonic log is available, use the interval transit time, $\Delta t_C$ (where $V_P = 1/\Delta t_C$) and bulk density log, $\rho_b$, to calculate the saturated P-wave modulus, $M_{sat}$, from Equation (5) for the depth interval of interest.
4. Using standard wireline log analyses techniques for estimating clay volume fraction, calculate the effective M-modulus of the mineral phase, $M_{min}$, making up the rock, using Hill's (1952) average of the individual constituents:

$$M_{min}^{Hill} = \frac{M_{min}^{Voight} + M_{min}^{Reuss}}{2} \quad (6)$$

where, $$M_{min}^{Voight} = \sum_{i=1}^{n} V_i M_i \quad (7)$$

$$\frac{1}{M_{min}^{Reuss}} = \sum_{i=1}^{n} \frac{V_i}{M_i} \quad (8)$$

and "$V_i$" is the volume fraction of the $i^{th}$ mineral and "$M_i$" the P-wave modulus of the $i^{th}$ mineral.

5. Using standard wireline log analyses techniques for estimating fluid saturations within the invaded zone borehole environment (e.g. Alberty, 1994, Walls and Carr, 2001) calculate the effective M-modulus of the fluid phase, $M_{fl}$, occupying the pore space using the Reuss average of the individual fluid constituents.
6. Using standard wireline log analyses techniques calculate the porosity, $\phi$, for the depth interval of interest.
7. Substitute $M_{sat}$, $M_{min}$, $M_{fl}$ and $\phi$ as calculated in stages 3 to 6 respectively, into the P-wave modulus approximation of Gassmann's relation (Mavko, Chan and Mukerji, 1995) in order to calculate a dry-equivalent P-wave modulus, $M_{dry}$, using:

$$M_{dry} \approx \frac{M_{sat}\left(\phi \frac{M_{min}}{M_{fl}} + 1 - \phi\right) - M_{min}}{\phi \frac{M_{min}}{M_{fl}} + \frac{M_{sat}}{M_{min}} - 1 - \phi} \quad (9)$$

8. Setting "$M_{dry}$" calculated from stage 7 equal to "$\Psi$" in Equation (3) use the equation's symmetric transition function with the appropriate $\alpha_0$, $\alpha_1$ and $\alpha_2$ empirical constants to calculate the equivalent plastic rock compressibility (either UPVC or UBVC).

Following adjustment of log-derived petrophysical properties based on established rock physics theory as detailed above (Step 25 in FIG. 2), mechanical properties throughout the subsurface strata of interest are estimated by employing the database-derived predictive algorithms using the adjusted log-derived petrophysical properties as data input (Step 26 in FIG. 2 and item 8 above). An example of predicted mechanical properties extrapolated throughout the subsurface strata of interest is given in FIG. 7. Predicted mechanical properties can then be utilized within any desired numerical model of the subsurface for geomechanical analysis (Step 27 in FIG. 2).

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will also readily recognize that in preferred embodiments of the invention, at least some of the steps in the present inventive method are performed on a computer, i.e. the invention is computer implemented.

REFERENCES

Patents

Birchwood, R. A., "Method and system for managing a drilling operation in a multicomponent particulate system," PCT Patent Application Pub. No. WO 2008/028075 A2.

Smith, L. M and Goldman, W. A., "Method of assaying compressive strength of rock," U.S. Pat. No. 5,767,399 (1998).

Other Publications

Alberty, M., "The influence of the borehole environment upon compressional sonic logs," SPWLA 35th Annual Logging Symposium, Houston Tex., Jun. 19-22, 1994.

Bhuyan, K. and Passey, Q. R., "Clay estimation from GR and neutron-density porosity logs," SPWLA 35th Annual Logging Symposium, Houston Tex., Jun. 19-22, 1994.

Carlson, M. R., *Practical Reservoir Simulation*, PennWell, Tulsa Okla., pages 199-201 (2003).

Chang et al., "Empirical relations between rock strength and physical properties in sedimentary rocks," *J. Pet. Sci & Eng.* 51, 223-237 (2006).

Coates and Denoo, "Mechanical properties program using borehole analysis and Mohr's circle," SPWLA 22nd Annual Logging Symposium, Mexico City, Jun. 19-22, 1981.

Cooper and Hatherly, "Prediction of rock mechanical properties from wireline data and their use in drilling simulation," SPE 83509, presented at the SPE Western Regional/AAPG Pacific Section Joint Meeting, Long Beach Calif., May 29-24, 2003.

Deere and Miller, "Engineering classification and index properties for intact rock," Tech. Rep. AFWL-TR-65-116 (1969).

Fjaer et al., *Petroleum Related Rock Mechanics*, Elsevier, Amsterdam, pages 232-234 (1992).

Griffith, "Theory of rupture," Proc. 1st Int. Cong. Appl. Mech., Delft, 53-63 (1924).

Guenther et al., "South Diana, Gulf of Mexico, USA: A case study in reservoir management of a compacting gas reservoir," IPTC 10900, presented at the International Petroleum Technology Conference, Doha, Qatar, Nov. 21-23, 2005.

Hall, "Compressibility of reservoir rocks," Trans. AIME 198, 309-311 (1953).

Hill, "The elastic behavior of crystalline aggregate," Proc. Physical Soc. London, A65, 349-354 (1952).

Hoek and Brown, *Underground Excavations In Rock*, The Institute of Mining & Metallurgy, London, pages 137-149 (1980).

Jaeger and Cook, *Fundamentals of Rock Mechanics*, 3rd Ed., Chapman & Hall, London, pages 95-101 (1979).

Khatchikian, "Deriving reservoir pore-volume compressibility from well logs," SPE 26963, SPE Advanced Technology Series, Vol. 4, No. 1 (1995).

Kuster and Toksoz, "Velocity and attenuation of seismic waves in two-phase media: Part 1. Theoretical formulations," *Geophysics* 39, 587-606 (1974).

Lachance and Andersen, "Comparison of uniaxial strain and hydrostatic stress pore-volume compressibilities in the Nugget sandstone," SPE 11971, presented at the 58th Annual Technical Conference and Exhibition, San Francisco Calif., Oct. 5-8, 1983.

Marion et al., "Compressional velocity and porosity in sand-clay mixtures," *Geophysics* 57, 554-563 (1992).

Mavko, Chan and Mukerji, "Fluid substitution: estimating changes in VP without knowing VS," *Geophysics* 60, 1750-1755 (1995).

Mavko, Mukerji and Dvorkin, *The Rock Physics Handbook—Tools for Seismic Analysis in Porous Media*, Cambridge University Press, pages 17-19, 110-112 and 162-220 (1998).

McClintock and Walsh, "Friction on Griffith cracks under pressure," Proc. 4th US Nat. Cong. of Appl. Mech., 1015-1021 (1962).

McLean and Addis, "Wellbore stability analysis: a review of current methods of analysis and their field application," SPE 19941, presented at the SPE/IADC Drilling Conference, Houston Tex., Feb. 27-Mar. 2, 1990.

Murrell, "A criterion for brittle fracture of rocks and concrete under triaxial stress and the effect of pore pressure on the criterion," Proc. 5th Rock Mech. Symp., Pergamon Press, Oxford, 563-577 (1963).

Newman, "Pore-volume compressibility of consolidated, friable and unconsolidated reservoir rocks under hydrostatic loading," *JPT* 25, 129-134 (1973).

Nouri et al., "A comparison of two sanding criteria in physical and numerical modeling of sand production," *J. Pet. Sci & Eng,* 50, 55-70 (2006).

Nur et al., "Critical porosity: a key to relating physical properties to porosity in rocks," *The Leading Edge* 17, 357-362 (1998).

O,Connell and Budiansky, "Seismic velocities in dry and saturated cracked solids," *J. Geophys. Res.* 79, 5412-5426 (1974).

Ong et al., "Pressure-dependent pore volume compressibility—a cost effective log-based approach," SPE 72116, presented at the SPE Asia Pacific Improved Oil Recovery Conference, Kuala Lumpur, Malaysia, Oct. 8-9 (2001).

Peska and Zoback, "Compressive and tensile failure of inclined wellbores and determination of in situ stress and rock strength," *J. Geophys. Res.* 100, 12791-12811 (1995).

Raaen et al., "FORMEL—a step forward in strength logging," SPE 36533, presented at the SPE Annual Technical Conference and Exhibition, Denver Colo., Oct. 6-9 (1996).

Rhett and Teufel, "Stress path dependence of matrix permeability of North Sea sandstone reservoir rock," Proceedings of the 33rd US Symposium on Rock Mechanics, Santa Fe N. Mex., 3-5 June, eds. Tillerson and Wawersik, 345-353. Rotterdam: Balkema (1992).

Simonson et al., "Containment of massive hydraulic fractures," *SPE Journal*, February, 1978, 27-32.

Teeuw, "Prediction of formation compaction from laboratory compressibility data," *SPE Journal*, September, 263-268 (1981).

Vernik and Nur, "Petrophysical classification of siliciclastics for lithology and porosity prediction from seismic velocities," AAPG 76, 1295-1309 (1992).

Voight, "On the relationship between the two elastic constants of an isotropic body," *Weid. Ann.* 38, 573-587 (1889).

Walls and Carr, "The use of fluid substitution modeling for correction of mud filtrate invasion in sandstone reservoirs," 71st SEG, Ann. Inter. Mtg. and Expos., San Antonio, Tex., Sep. 4-11, 2001.

Wolfe et al., "Log-based pore volume compressibility prediction—a deepwater GoM case study," SPE 95545, SPE Annual Technical Conference and Exhibition, Dallas Tex., Oct. 9-12, 2005.

Yuan and Harrison, "A review of the state of the art in modeling progressive mechanical breakdown and associated fluid flow in intact heterogeneous materials," *Int. J. Rock Mech.* 43, 1001-1022 (2006).

Zimmerman, "Compressibility of two-dimensional cavities of various shapes," *J. App. Mech.* 53, 500-504 (1986).

Zimmerman, "Compressibility of sandstones", Developments in Petroleum Science, 29, pp. 17-19, 110-139, Elsevier

The invention claimed is:

1. A computer implemented method for predicting a plastic mechanical property in a selected subsurface rock formation without lab testing of core samples from said formation, comprising:

using one or more empirical predictive algorithms in a computer, based on a database of mechanical and associated petrophysical rock properties developed from laboratory testing of core samples from other formations with varying lithologies, to predict a plastic mechanical property from one or more measured or estimated petrophysical properties of the selected formation, wherein the one or more empirical predictive algorithms are constructed using empirical correlations between mechanical and associated petrophysical properties from analysis of portions of the rock properties database selected as having lithologic similarity to said selected rock formation; and using rock physics theory to adjust the one or more log petrophysical properties to account for one or more differences between laboratory conditions for the rock database data and in situ conditions applicable to the measurement or estimation of the one or more petrophysical properties of the selected formation.

2. The method of claim 1, wherein the mechanical rock property to be predicted is rock compressibility and a compressional sonic wireline log is used to predict a mechanical property of the selected formation, and the rock physics adjustment comprises calculating a dry-equivalent P-wave modulus corresponding to fluid-containing in situ conditions for the compressional sonic log.

3. The method of claim 1, wherein the mechanical rock property to be predicted is rock strength, and the rock physics adjustment corrects the clay percentage in shale to match lithologies between the rock properties database and the in situ conditions applicable to the measurement or estimation of the one or more petrophysical properties of the selected formation.

4. The method of claim 1, wherein the mechanical rock property to be predicted is rock strength, and the empirical correlations comprise a correlation between increasing rock strength (from triaxial compression testing) and either (1) decreasing porosity (derived from routine core analysis) or (2) decreasing fine-grained matrix component (derived from petrographic thin section analysis).

5. The method of claim 4, wherein the one or more empirical predictive algorithms is represented by the following equations for shear strength z as a function of porosity $\phi$:

$$z=(\alpha_0 y+\alpha_1)x^{[\alpha_2+\alpha_3 exp(-\alpha_4 y)]} \text{ for } x \leq \beta$$

$$z=(\alpha_5 y+\alpha_6)x-(\alpha_7 y+\alpha_8) \text{ for } x \geq \beta$$

where x=porosity difference ($\phi_C-\phi$), y=normal stress, $\phi_C$ is a critical porosity used to establish a hypothetical zero strength condition for siliciclastic database rocks, which are subdivided by a petrophysical classification scheme into three distinct groups wherein sandstones are divided into two groups called arenites and wackes and the third group is shales; $\alpha_0 \ldots \alpha_8$=arenite-, wacke- and shale-dependent empirical constants derived from analysis of the lithologically similar portions of the rock properties database; and $\beta$=arenite-, wacke- and shale-dependent predictor cutoff limits for x based on an observed transition in the rate of change of shear strength with porosity difference at a particular ambient porosity fraction for each rock group.

6. The method of claim 5, wherein $\phi_C \approx 0.37$ for sandstones and $\approx 0.60$ for shales, and $\beta \approx 0.31$ for sandstones and $\approx 0.50$ for shales.

7. The method of claim 1, wherein the mechanical rock property to be predicted is rock compressibility, and the empirical correlations comprise a correlation between increasing rock compressibility (either UPVC or UBVC at initial reservoir stress conditions derived from uniaxial strain compaction testing) and decreasing effective elastic moduli (at initial reservoir stress conditions also derived from uniaxial strain compaction testing).

8. The method of claim 7, wherein the one or more empirical predictive algorithms is represented by the following equation for uniaxial compressibility C, either pore UPVC or bulk UBVC, as a function of $\Psi$ which can be either shear-wave modulus (G) or P-wave modulus (M):

$$C = \frac{\alpha o}{\pi}\left[\arctan\left(\frac{\Psi - \alpha_1}{\alpha_2}\right) + \frac{\pi}{2}\right]$$

where $\alpha_0$, $\alpha_1$ and $\alpha_2$ are compressibility- and moduli-specific empirical constants derived from analysis of the lithologically similar portions of the rock properties database.

9. The method of claim 8, wherein C is directly evaluated from the selected formation's measured or estimated petrophysical properties knowing bulk density $\rho_b$ and shear velocity $V_S$ or compressional velocity $V_P$ respectively:

$$\Psi=G=\rho_b V_s^2 \text{ (shear wave modulus)}$$

$$\Psi=M=\rho_b V_P^2 \text{ (P-wave modulus)}.$$

10. The method of claim 1, wherein petrophysical properties of the selected formation are generated from wireline logs of the selected formation, and the prediction of a plastic mechanical property of the selected formation is made without benefit of lab testing of core samples from said formation.

11. The method of claim 1, wherein the prediction of a plastic mechanical property of the selected formation does not use any of:
(i) a micromechanical model to simulate constitutive stress-strain behavior;
(ii) a microstructural characterization of the selected formation's rock strata;
(iii) the selected formation's in situ stress field or pore pressure magnitude;
(iv) lab testing of core samples from the selected formation.

12. The method of claim 1, wherein the petrophysical properties of the selected formation are measured or estimated from at least one of wireline logs, analysis of drilling cuttings or cores, and inference from geologic models.

13. The method of claim 1, further comprising:
constructing a numerical model of the subsurface based on the predicted mechanical properties.

* * * * *